United States Patent [19]
Lee et al.

[11] Patent Number: 5,883,983
[45] Date of Patent: Mar. 16, 1999

[54] ADAPTIVE POSTPROCESSING SYSTEM FOR REDUCING BLOCKING EFFECTS AND RINGING NOISE IN DECOMPRESSED IMAGE SIGNALS

[75] Inventors: Yung-Lyul Lee; Hyun-Wook Park, both of Seoul, Rep. of Korea

[73] Assignee: Samsung Electronics Co., Ltd., Kyungki-Do, Rep. of Korea

[21] Appl. No.: 728,048

[22] Filed: Oct. 9, 1996

[30]    Foreign Application Priority Data

Mar. 23, 1996 [KR]    Rep. of Korea ..................... 1996 8041

[51] Int. Cl.⁶ .................................................. G01S 13/86
[52] U.S. Cl. ........................................... 382/268; 382/270
[58] Field of Search ................................. 382/268, 270, 382/275

[56]    References Cited

U.S. PATENT DOCUMENTS

| | | | |
|---|---|---|---|
| 5,268,967 | 12/1993 | Jang et al. | 382/6 |
| 5,341,142 | 8/1994 | Reis et al. | 342/64 |
| 5,359,676 | 10/1994 | Fan | 382/56 |
| 5,539,842 | 7/1996 | Schwartz | 382/232 |

*Primary Examiner*—David K. Moore
*Assistant Examiner*—Stephen Brinich
*Attorney, Agent, or Firm*—Sughrue, Mion, Zinn, Macpeak & Seas, PLLC

[57]    ABSTRACT

An adaptive signal filtering method is provided to reduce blocking effects caused by decompression the block-based compressed images. The method includes the steps of generating binary edge map information by globally thresholding and locally thresholding the decompressed image; determining whether the binary edge map information within a filter window corresponding to respective pixels corresponds to a homogeneous area or an edge area, by using the binary edge map information corresponding to the filter window; generating a filtered pixel value corresponding to a respective pixel using the filter window which has a predetermined first weight factors for the homogeneous area when the binary edge map information is determined to be a homogeneous area in the determining step; adapting a predetermined second weight factors according to binary edge map information included in the filter window when the binary edge map information determined as an edge area in the second step; and generating a filtered pixel value for the respective pixel, using the filter window which has adapted second weight factors in said adapting step.

22 Claims, 4 Drawing Sheets

| 1 | 1 | 1 |
|---|---|---|
| 1 | 1 | 1 |
| 1 | 1 | 1 |

| 1 | 1 | 1 |
|---|---|---|
| 1 | 3 | 1 |
| 1 | 1 | 1 |

…

ADAPTIVE POSTPROCESSING SYSTEM FOR REDUCING BLOCKING EFFECTS AND RINGING NOISE IN DECOMPRESSED IMAGE SIGNALS

BACKGROUND OF THE INVENTION

The present invention relates to an adaptive postprocessing system for reducing blocking effects and ringing noise of an image signal. More particularly, the system of the present invention adaptively attenuates blocking effects and ringing noise appearing in a decompressed image which has been subject to highly efficient image compression.

Most picture coding standards, including H.263 of the International Telecommunication Union (ITU) and MPEG-1 and MPEG-2 of the Organization for Standardization (ISO), use block-based processing for motion estimation and discrete cosine transformation (DCT). It is well-known that such block-based processing induces blocking effects and the ringing noise, which is particularly noticeable when an image has been highly compressed. Typical blocking effects include grid noise in monotone areas and the staircase noise along the image edges. Due to these effects, a viewer who views the decompressed image displayed on a screen perceives the boundary between the blocks composing the decompressed image. The ringing noise produces sinusoidal traces on the edges of an image.

SUMMARY OF THE INVENTION

To solve the above problems, it is an object of the present invention to provide a method for significantly reducing blocking effects and ringing noise due to decompression of a highly compressed image by adaptively filtering decompressed image data according to edge information obtained from the decompressed image.

To accomplish the above object of the present invention, there is provided an adaptive signal filtering method for reducing blocking effects of a decompressed digital image, comprising the steps of:

(a) generating binary edge map information by comparing pixel information of the decompressed image with a global threshold and with local threshold values;

(b) determining whether the binary edge map information within a filter window contains data for a homogeneous area or an edge area, said filter window corresponding to a set of contiguous pixels;

(c) generating a filtered pixel value for each pixel using the filter window, said filter window having a set of first weight factors when the binary edge map information is determined to correspond to a homogeneous area in said step (b);

(d) adapting a set of second weight factors for pixels of the filter window according to the binary edge map information when the binary edge map information is determined to correspond to an edge area in said step (b); and (e) generating a filtered pixel value corresponding to the respective pixel, using the filter window having adapted second weight factors of said step (d) for producing an image from the filtered pixel values.

BRIEF DESCRIPTION OF THE DRAWINGS

Preferred embodiments of the present invention are described with reference to the drawings wherein.

DETAILED DESCRIPTION OF THE PREFERRED EMBODIMENT

A preferred embodiment of the present invention will be described below in more detail with reference to the accompanying drawings.

Figure 1:
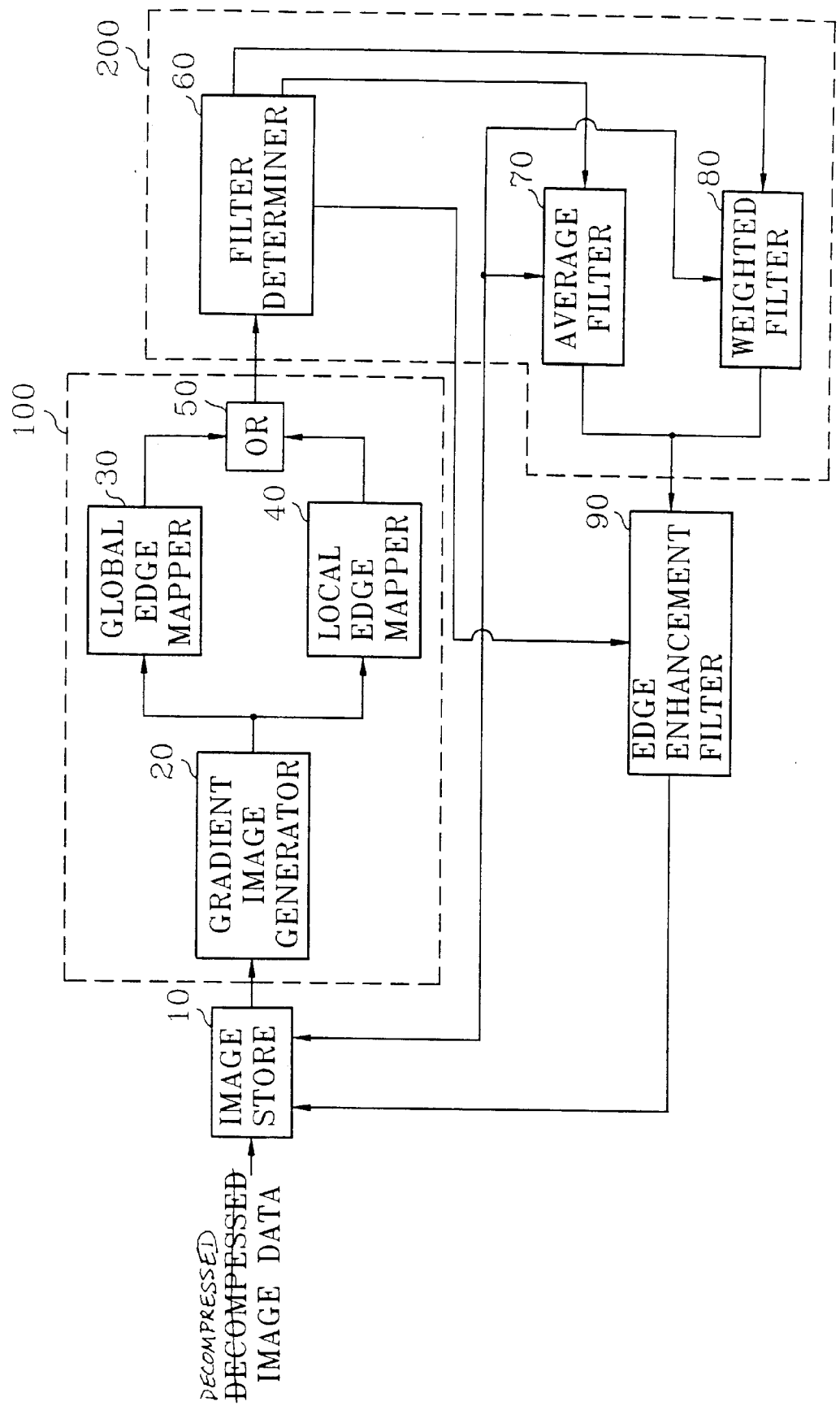
FIG. 1 is a block diagram showing an adaptive postprocessing apparatus for reducing blocking effects and ringing noise in an image signal according to a preferred embodiment of the present invention.

In FIG. 1, an adaptive postprocessing apparatus according to a preferred embodiment of the present invention includes an image store 10, an image edge mapper portion 100 and a signal adaptive filter portion 200. The image store 10 stores decompressed image data. More specifically, the data is obtained by performing inverse processing of a source encoding process, which includes motion estimation and discrete cosine transformation. The binary edge mapper portion 100 includes a gradient image generator 20, a global edge mapper 30, a local edge mapper 40 and a logic sum unit 50. The logic sum unit generates binary edge map information-which reflects global edges and local edges defining the decompressed image. The signal adaptive filter portion 200 includes a filter determiner 60, an average filter 70, and a weighted filter 80. The adaptive filter portion filters the decompressed image data using the average filter or the weighted filter which are described below. The nature of filtering depends on the binary edge map information. The grid noise and the staircase noise is mitigated in the signal adaptive filter portion 200. The apparatus of FIG. 1 further comprises an edge enhancement filter 90 for enhancing the edge information of the signal-adaptive-filtered image and for reducing the staircase noise.

The gradient image generator 20 generates gradient image data from the image data stored in the image store 10. The gradient image generator 20 applies a vertical Sobel gradient operator and a horizontal Sobel gradient operator to the decompressed image stored in the image store 10 to generate a gradient image. The gradient image data obtained by the gradient image generator 20 is supplied to the global edge mapper 30 and the local edge mapper 40.

The global edge mapper 30 produces a global edge map with respect to the whole image, and the local edge mapper 40 divides the whole image into a number of blocks having a predetermined size and produces a local edge map with respect to each block.

For example, the global edge mapper 20 calculates an edge value for each pixel using the following equation (1).

$$\text{If } |\nabla_h|+|\nabla_v| \geq T_g, \text{ edge}(i,j)=1 \text{ Otherwise, edge}(i,j)=0 \quad (1)$$

Here, $\nabla_h$ and $\nabla_v$ represent a horizontal gradient image and a vertical gradient image at location (i,j) obtained by the horizontal Sobel gradient operator and the vertical Sobel gradient operator, respectively. The sum $|\nabla_h \nabla| + |\nabla_v \nabla|$ represents a gradient value at location (i,j), and $T_g$ is a global threshold value. $T_g$ has an exemplary value of 100 when each pixel of the decompressed image has 256 grey levels. If a gradient value of a pixel is larger than or equal to the global threshold value $T_g$, the global edge mapper 30 assigns such pixel an edge value of "1." On the other hand, if the gradient value of a pixel is smaller than the global threshold value $T_g$, the global edge mapper 30 assigns such pixel an edge value of "0." The global edge map information obtained by applying the above equation to the pixels of the decompressed image is supplied to the logic sum unit 50.

The local edge mapper 40 also produces a local edge map using the output of the gradient image generator 20. The local edge mapper 40 divides the decompressed image into $M_1 \times M_2$ size blocks and calculates a local threshold value with respect to each $M_1 \times M_2$ block of the gradient image. The local edge mapper then calculates local edge values with respect to all gradient values contained in the respective blocks using the calculated local threshold value for the block. According to the MPEG standard, the block-based processing techniques, such as DCT transformation and quantization, are used to process signals organized into 8×8 blocks with each block basically comprising 8×8 pixels. Thus, according to one embodiment of the present invention, the local edge mapper 40 is also designed to draw a local edge map comprising 8×8 blocks. However, it will be apparent to a person skilled in the art that the present invention is not limited to the block of such a size.

The local threshold value $T_n$ with respect to an n-th 8×8 image block in the gradient image is defined by the following equations (2)–(4).

$$T_n = \left| 1 - \frac{\sigma_n}{m_n} \right| x T_g \quad (2)$$

wherein $$\sigma_n = \sqrt{\frac{1}{N} \sum_{(i,j) \in R_n} (g(i,j) - m_n)^2} \quad (3)$$

$$m_n = \frac{1}{N} \sum_{(i,j) \in R_n} g(i,j) \quad (4)$$

Here, g(i,j) represents a gradient value, $R_n$ represents an n-th 8×8 block region, $m_n$ and $\sigma_n$ represent the mean value and the standard deviation of the n-th 8×8 block of the gradient image, respectively. $T_g$ represents a global threshold value and N is 64 in the case of an 8×8-sized block. If the n-th 8×8 block is a part of a homogeneous area, a ratio $\sigma_n/m_n$ tends to be "0," with the result that the value of $T_n$ approaches $T_g$. Meanwhile, if the n-th 8×8 block is part of a complicated image area, the ratio $\sigma_n/m_n$ increases. As a result, $T_n$ becomes smaller than $T_g$. This small value of $T_n$ is used for producing a detailed edge map which is not classified with respect to $T_g$, so that a local edge map can be calculated by $T_n$.

The local edge mapper 40 compares the magnitudes of the local threshold value $T_n$ of the n-th 8×8 block with a collection of individual gradient values within the block. The bases of these comparisons are gradient values which correspond to 6×6 pixels within the 8×8 block, excluding the boundary pixels of the 8×8 block. If the gradient value used for drawing the local edge map is defined as described above, the detailed information is protected from becoming blurred and the grid noise is prevented from being detected as an image edge.

If the compared gradient value of one of the 6×6 pixels within the n-th 8×8 block region $R_n$ is larger than or equal to the local threshold value $T_n$, the local edge mapper 40 assigns the pixel a local edge value of "1." Meanwhile, if a gradient value corresponding to a pixel is smaller than the local threshold value $T_n$, the local edge mapper 40 assigns the pixel a local edge value of "0." The local edge mapper 40 generates local edge map information by performing a processing procedure for 8×8 block divisions and calculates local edge values. Calculation of the local edge values is performed using gradient values of selected pixels of each block from all gradient values generated by the gradient image generator 20. The generated local edge map information is supplied to the logic sum unit 50.

Figure 3:
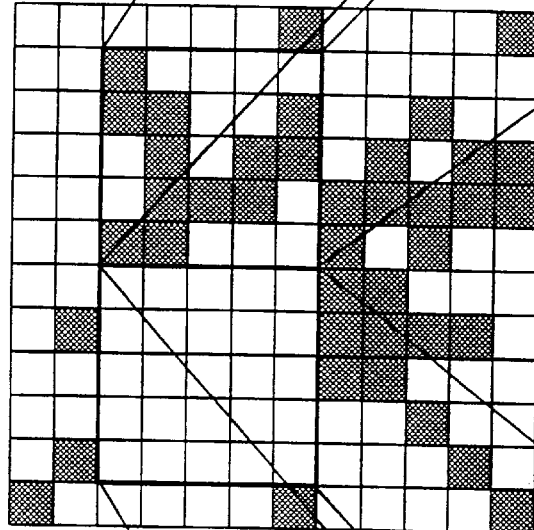
FIG. 3 shows the binary edge map produced in the binary edge mapper of FIG. 1.

The logical OR unit 50 performs a logical OR operation of the global edge map information and the local edge map information on a pixel by pixel basis. The logical OR unit 50 performs a logical OR operation with respect to all global edge values on the global edge map and all local edge values on the local edge map, and outputs binary edge map information representing the result to the filter determiner 60. The binary edge map produced by the logical OR unit 50 is conceptually shown in FIG. 3.

The filter determiner 60 stores the binary edge map information supplied from the logical OR unit 50. The decompressed image is classified into two areas such as an edge area and a homogeneous area. For this classification, the filter determiner 60 uses a filter window of a selected size and determines whether a region of the binary edge map encompassed by the filter window is an edge area or a homogeneous area based on the edge values of pixels contained in the filter window. That is, the filter determiner 60 determines that the region in the filter window is a homogeneous area if all of the edge values contained in this region of the binary edge map within the filter window are "0", and that the region in the filter window is an edge area if any edge value contained in the region is "1". If the region in the filter window is determined to be a homogeneous area, the filter determiner 60 outputs position data with respect to the central point in the filter window to the average filter 70. If the region in the filter window portion is determined to be an edge area, the filter determiner 60 outputs the binary edge map information and position data with respect to the central point in the filter window to the weighted filter 80. Here, the central point represents a point where the pixel value of the point is replaced by a new value.

The average filter 70 and the weighted filter 80 according to the embodiments of the present invention use a 5×5 filter window or a 3×3 filter window. Accordingly, the filter window used in the filter determiner 60 also has a 3×3 or 5×5 size. The average filter 70 and the weighted filter 80 are two-dimensional low-pass filters, which will be described below. The following illustrates use of a 5×5 filter window and corresponding average and weighted filter for a window of this dimension.

Figure 2:
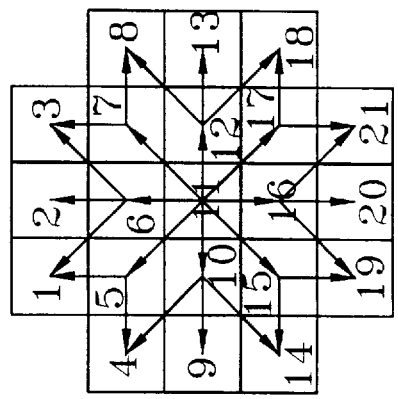
FIG. 2A shows a filter window for a 5×5 filter proposed in the present invention.
FIG. 2B shows the weight factors for the 5×5 average filter.
FIG. 2C shows the weight factors for the 5×5 weighted filter.

FIGS. 2A–2C show the filter window and the weight factors for a 5×5 filter. FIG. 2A shows a filter window for a 5×5 filter. In FIG. 2A, the numerical figures represent filter coefficient (or weight) indices. The point where the filter coefficient index value is "11" represents the central point of the filter window. FIGS. 2B and 2C show the weight factors when the 5×5 filter window is used. FIG. 2B shows the weight factors for the 5×5 average filter. FIG. 2C shows the weight factors for the 5×5 weighted filter. The weight factor of "3" at the central point shown in FIG. 2C may be replaced by 4. The arrows of FIG. 2A are used to define outer neighboring points relative to a particular edge point. Here, the edge point is a position where the edge value is "1" and is represented as shaded rectangles on the binary edge map of FIG. 3. If position data with respect to the central point is input, the average filter 70 reads the pixel values necessary to calculate the filtered pixel value of the central point from the image store 10. In the case where the filter window corresponds to a homogeneous area, the average filter 70 calculates the filtered pixel values using the read pixel values and the weight factors shown in FIG. 2B. The calculated filtered pixel value is used as an adjusted pixel value with respect to the central point.

The weighted filter 80 also performs a filtering operation based on the binary edge map information supplied from the filter determiner 60 and the position data with respect to the central point. The operation of the weighted filter 80 will be described below in more detail.

If the central point "11" of the filter window shown in FIG. 2A is an edge point, the weighted filter 80 does not perform a filtering operation for the central point. If an edge point is positioned in the 5×5 filter window in a position other than the central point, the weighted filter 80 performs a filtering operation using the weight factors shown in FIG. 2C. The weight factors are varied according to the positions of the edge point in the filter window to protect details of the image. If an edge point is on the positions 12, 7, 6, 5, 10, 15, 16 or 17 of FIG. 2A, the weight factor of the pixel is set to zero. Additionally, the outer neighbor pixels of the edge point pixel, as shown by the arrows of FIG. 2A, are also set to zero. For example, if the point 12 is an edge point, the points 12, 8, 13 and 18 will be outer neighbor points whose weight factors are also set to zero. If the point 7 is an edge pixel, the points 7, 3 and 8 will be outer neighbor points whose weight factors will also be set to zero.

The average filter 70 and the weighted filter 80 for a 3×3 window will be described below.

Figures 4A, 4B, 4C:
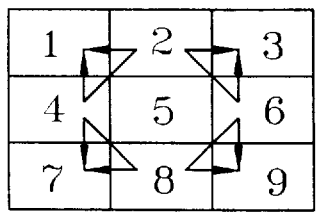
FIG. 4A shows a filter window for a 3×3 filter proposed in the present invention.
FIG. 4B shows the weight factors for the 3×3 average filter.
FIG. 4C shows the weight factors for the 3×3 weighted filter.

FIGS. 4A–4C show the filter window and the weight factors for a 3×3 filter. FIG. 4A shows a filter window for a 3×3 filter. FIG. 4B shows the weight factors for the 3×3 average filter. FIG. 4C shows the weight factors for the 3×3 weighted filter. The weight factor of "3" at the central point shown in FIG. 4C may be replaced by 2. In FIG. 4A, a point where the filter weighted index value is "5" represents the central point of the filter window. The average filter 70 performs the same operation as the case using the 5×5 filter window having the filter weight factors shown in FIG. 4B. The operation of the average filter 70 in the case of using the 3×3 filter window will be omitted, since one skilled in the art can understand the operation with reference to the above-described 5×5 average filter.

If the central point "5" of the filter window shown in FIG. 4A is an edge point, the weighted filter 80 does not perform a filtering operation for the central point. If an edge point is positioned in the 3×3 filter window in a position other than the central point, the weighted filter 80 performs a filtering operation using the weight factors shown in FIG. 4C. If any edge point is located at the positions 2 and 6, 6 and 8, 4 and 8, or 2 and 4 of FIG. 4A, the weight factors of the edge pixel and the outer neighbor pixels are set to zero.

The signal adaptive filtered image data obtained by the average filter 70 and the weighted filter 80 are supplied to the image store 10. The image store 10 replaces a corresponding pixel value by the image data supplied from the average filter 70 and the weighted filter 80. If the image store 10 replaces the original decompressed image data by the adaptively filtered image data with respect to all pixels, an image which is displayed by using the adapted image data has a quality of reduced blocking effects and ringing noise.

The results using CLASS-A and CLASS-B test sequences of MPEG-4 and H.263+ will be described. When a sequence of CLASS-A is used, a desired quality of image can be obtained by performing only adaptive filtering with respect to the binary edge map information. However, when a CLASS-B sequence is used, an improved quality of image can be obtained by performing edge enhancement filtering with respect to the adaptively filtered image signal.

The edge enhancement filter 90 according to an embodiment of the present invention is designed as a one-dimensional three-tap filter whose weight factor is (1,4,1). If the adaptively filtered signal produced by the average filter 70 and the weighted filter 80 is applied, the edge enhancement filter 90 determines the direction of the edge as one of 45°, 135°, 90° and 0° from the signal adaptive filtered image. To make this determination, the edge enhancement filter 90 uses the binary edge map information stored in the filter determiner 60. The edge enhancement filter 90 performs one-dimensional filtering by using the filter weight factors with respect to all edge points of the signal adaptive filtered image whose direction has been determined. The edge information is reinforced and the staircase noise is reduced by the edge enhancement filter 90. The filtered image data in the edge enhancement filter 90 is supplied to the image store 10. The image store 10 performs the same operation on the data from the edge enhancement filter 90 as is performed on the image data supplied from the average filter 70 and the weighted filter 80. Thus, when the edge enhancement filter is additionally used, the blocking effects are reduced and the edge enhanced image can be provided to viewers.

The CLASS-A and CLASS-B sequences, which have been encoded and decoded in H.263, are used for evaluating the postprocessing system proposed in the present invention. The 3×3 signal adaptive filter is applied to the CLASS-A sequence which are encoded and decoded in H.263, while the 3×3 signal adaptive filter and the 5×5 signal adaptive filter are applied to the CLASS-B sequence. In the CLASS-B sequence, the 3×3 filtered image has a higher peak signal to noise ratio (PSNR) than the 5×5 filtered image. However, the subjective quality of the 5×5 filtered image is better than the 3×3 filtered image. Therefore, the 5×5 signal adaptive filtering and the one-dimensional edge enhancement filtering are desirable for processing the CLASS-B sequence even though the PSNR is degraded somewhat. Tables 1 and 2 show the decompressed sequences and various postprocessing sequences. Table 1 shows the test result of the CLASS-A sequences, in which (a) is the result of the 3×3 msignal-adaptive filter proposed in the present invention. The Table 2 shows the test result of the CLASS-B sequences, in which (a) is the result of the 3×3 signal-adaptive filter, (b) is the result of the 5×5 signal-adaptive filter and (c) is result of the 5×5 signal-adaptive filter and the edge enhancement filter.

TABLE 1

| Bit Rate Spatial Reslution Frame Rate | Sequence | H.263 (PSNR) | (a) |
|---|---|---|---|
| 10 kbps, QCIF, 5 Hz | Akiyo | 34.81 | 35.06 |
| | Hall monitor | 32.65 | 32.88 |
| | Container ship | 31.97 | 32.00 |
| | Mother & daughter | 33.81 | 33.93 |
| 24 kbps, QCIF, 10 Hz | Akiyo | 36.18 | 36.25 |
| | Hall monitor | 33.68 | 33.88 |
| | Container ship | 33.36 | 33.32 |
| | Mother & daughter | 35.18 | 35.18 |

TABLE 2

| Spatial Resolution Frame Rate | Bit Rate | Sequence | H.263 (PSNR) | (a) | (b) | (c) |
|---|---|---|---|---|---|---|
| CIF, 7.5 Hz | 48 kbps | News | 32.00 | 32.13 | 32.06 | 31.97 |
| | 77 kbps | Foreman | 29.46 | 29.53 | 29.54 | 29.53 |
| | 70 kbps | Coastguard | 26.35 | 26.35 | 26.31 | 26.27 |
| | 48 kbps | Silent voice | 31.41 | 31.55 | 31.47 | 31.46 |
| CIF, 15 Hz | 112 kbps | News | 34.42 | 34.59 | 34.46 | 34.27 |
| | 112 kbps | Foreman | 30.06 | 30.12 | 30.12 | 30.07 |
| | 114 kbps | Coastguard | 26.71 | 26.71 | 26.68 | 26.62 |
| | 112 kbps | Silent voice | 32.89 | 33.04 | 32.90 | 32.83 |

As described above, the system according to the present invention improves the quality of the block-based decompressed image. The present invention uses adaptive filtering to reduce blocking effects without degradation of the image details. The signal-adaptive filtering is based on the edge information generated by a gradient calculation and an adaptive threshold scheme. The objective performance is measured by the PSNR. The measured PSNR shows small increase in CLASS-A and CLASS-B sequences when the 3×3 signal adaptive filter is adopted. However, the PSNR does not fully reflect the enhancement of the image quality from a psychovisual viewpoint or subjective perceptual viewpoint. Even though the improvement to the PSNR appears small, a significant improvement in subjective quality is observed. Therefore, the postprocessing system proposed in the present invention effectively reduces the blocking effects and the ringing noise, and preserves and enhances block-based decoded images without any increase in the bit rate.

While only certain embodiments of the invention have been specifically described herein, it will apparent that numerous modifications may be made thereto without departing from the spirit and scope of the invention.

What is claimed is:

1. An adaptive signal filtering method for reducing blocking effects and ringing noise of a decompressed digital image, said adaptive filtering method comprising the steps of:

(a) generating binary edge map information by comparing pixel information of the decompressed image with a global threshold and comparing the pixel information with local threshold values;

(b) determining whether the binary edge map information within a filter window contains data for a homogeneous area or an edge area, said filter window corresponding to a set of contiguous pixels;

(c) generating a filtered pixel value for each pixel using the filter window, said filter window is having a set of first weight factors when the binary edge map information is determined to correspond to a homogeneous area in said step (b);

(d) adapting a set of second weight factors for pixels of the filter window according to the binary edge map information when the binary edge map information is determined to correspond to an edge area in said step (b); and (e) generating a filtered pixel value corresponding to the respective pixel, using the filter window having adapted second weight factors of said step (d) for producing an image from the filtered pixel values.

2. The signal adaptive filtering method according to claim 1, wherein said step (a) comprises the steps of:

(a1) generating a gradient image corresponding to the decompressed image;

(a2) generating global edge map information which comprises edge values for each respective pixel of the gradient image, by comparing a first threshold value with each gradient value associated with respective pixels of the gradient image;

(a3) generating local edge map information which comprises edge values for each respective pixel of the gradient image by:

(a3)(a) dividing the gradient image into a plurality of image blocks, each of said image blocks having a predetermined size;

(a3)(b) generating a second threshold value for each respective image block and (a3)(c) comparing gradient values of pixels contained within an image block with said second threshold value corresponding to the respective image block; and (a4) logically summing an edge value in the global edge map information and a corresponding edge value in the local edge map information for each pixel of the gradient image to generate said binary edge map information.

3. The adaptive signal filtering method according to claim 2, wherein in said step (a3) the second threshold value for each image block is calculated according to the following equation:

$$T_n = \left|1 - \frac{\sigma_n}{m_n}\right| x T_g$$

wherein, $$\sigma_n = \sqrt{\frac{1}{N} \sum_{(i,j) \in R_n} (g(i,j) - m_n)^2}$$

$$m_n = \frac{1}{N} \sum_{(i,j) \in R_n} g(i,j)$$

where, g(i,j) represents a gradient value, $R_n$ represents an n-th image block of said plurality of image blocks, $M_n$ and $\sigma_n$ represent the mean and the standard deviation of the n-th image block of the gradient image, $T_g$ represents a global threshold value, and N represents a total number of pixels in each of said image blocks.

4. The adaptive signal filtering method according to claim 3, wherein each of said image blocks is 8×8 pixels in size and wherein in said step (a3)(c), each of the gradient values corresponding to 6×6 pixels within an n-th 8×8 image block, excluding boundary pixels of the 8×8 block, are compared with the second threshold value to generate said binary edge map information.

5. The adaptive signal filtering method according to claim 1, wherein the filter window includes a central pixel and wherein the second weight factors of pixels proximal to said central pixel are greater than the second weight factors of pixels distal from said central pixel.

6. The adaptive signal filtering method according to claim 5, wherein said filter window has a 5×5 matrix size.

7. The adaptive signal filtering method according to claim 6, wherein in said step (c), the pixel positions corresponding to the four corners of the 5×5 matrix have first weight factors of "0" and those remaining pixel positions of the 5×5 matrix have first weight factors of "1".

8. The adaptive signal filtering method according to claim 6, wherein said central pixel has a second weight factor of "3" and pixels other than said central pixel have second weight factors less than "2."

9. The adaptive signal filtering method according to claim 6, wherein said central pixel has a second weight factor of "4" and pixels other than said central pixel have second weight factors less than "2."

10. The adaptive signal filtering method according to claim 5, wherein said step (d) includes:
   (d1) examining pixels contained in the filter window to determine if pixels correspond to an edge point; and
   (d2) changing the second weight factor to zero for every edge point and outer neighboring pixel of each edge point.

11. The adaptive signal filtering method according to claim 5, wherein said filter window has a 3×3 matrix size.

12. The adaptive signal filtering method according to claim 11, wherein said step (c), all pixels of the filter window have the same first weight factors.

13. The adaptive signal filtering method according to claim 12, wherein said first weight factor is "1."

14. The adaptive signal filtering method according to claim 11 wherein said central pixel has a second weight factor of "2", and the remaining pixel positions have second weight factors of "1".

15. The adaptive signal filtering method according to claim 11, wherein said central pixel has a second weight factor of "3", and the remaining pixel positions have second weight factors of "1".

16. The signal adaptive filtering method according to claim 11, wherein said step (d) includes:
   (d1) examining pixels contained in the filter window, each pixel of the 3×3 matrix designated by p(row, column); and
   (d2) changing the second weight factor for p(1,1) to zero when p(1,2) and p(2,1) are edge points, changing the second weight factor for p(1,3) to zero when p(1,2) and p(2,3) are edge points; changing the second weight factor for p(3,1) to zero when p(2,1) and p(3,2) are edge points, and changing the second weight factor for p(3,3) when p(3,2) and p(2,3) are edge points.

17. The adaptive signal filtering method according to claim 1, wherein said step (e) performs no filtering operation for a pixel in a central point of the filter window if the pixel is an edge point.

18. The adaptive signal filter method according to claim 2, further comprising the step of:
   (f) producing an image from the filtered pixel values of the steps (b) and (e).

19. The adaptive signal filter method according to claim 3, further comprising the step of:
   (f) producing an image from the filtered pixel values of the steps (b) and (e).

20. The adaptive signal filter method according to claim 10, further comprising the step of:
   (f) producing an image from the filtered pixel values of the steps (b) and (e).

21. The adaptive signal filter method according to claim 2, wherein in said step (b), the binary edge map information within the filter window corresponds to a homogenous area when all the pixels of the filter window have gradient values which are less than the local and global threshold values.

22. The adaptive signal filter method according to claim 10, wherein in said step (b), the binary edge map information within the filter window corresponds to a homogenous area when all the pixels of the filter window have gradient values which are less than the local and global threshold values.

* * * * *